United States Patent [19]
Oshima et al.

[11] 4,072,880
[45] Feb. 7, 1978

[54] STARTING CONTROL APPARATUS FOR AC LOAD

[75] Inventors: Seiichi Oshima; Mamoru Miyamoto, both of Itami, Japan

[73] Assignee: Mitsubishi Denki Kabushiki Kaisha, Tokyo, Japan

[21] Appl. No.: 709,511

[22] Filed: July 28, 1976

[30] Foreign Application Priority Data

July 28, 1975 Japan .................................. 50-91743
Aug. 13, 1975 Japan .................................. 50-98193

[51] Int. Cl.² .......................................... H02K 17/02
[52] U.S. Cl. .................................. 318/227; 318/230; 318/207 R
[58] Field of Search ............... 318/227, 221 R, 221 E, 318/207 R, 230, 231, 410, 414

[56] References Cited
U.S. PATENT DOCUMENTS

3,764,871 10/1973 Scheuer et al. ...................... 318/227
4,015,178 3/1977 Phillot et al. ........................ 318/227

*Primary Examiner*—Herman J. Hohauser
*Attorney, Agent, or Firm*—Oblon, Fisher, Spivak, McClelland & Maier

[57] ABSTRACT

A starting control apparatus for an AC load includes a bidirectional triode thyristor switching device connected in series between an AC power source and the load, a rectifying circuit connected in parallel to the bidirectional triode thyristor switching device, a first time constant circuit connected between output terminals of the rectifying circuit which discharges to turn on the bidirectional triode thyristor switching device when the charged potential reaches a predetermined potential, a second time constant circuit connected between the output terminals of the rectifying circuit and having a time constant larger than the time constant of the first time constant circuit and maintaining the charged potential in the ON state of the bidirectional triode thyristor switching device, and a speedy charging device which rapidly increases the charged potential to the sustaining potential of the second time constant circuit during the recharging period for the first time constant circuit while recovering the controlling ability of the bidirectional triode thyristor switching device and which gradually decreases the period for charging the first time constant circuit to the predetermined potential. When the load is an inductive load such as an induction motor, a third time constant circuit having a time constant larger than the time constant of the second time constant circuit is preferably connected between output terminals of the rectifying circuit.

16 Claims, 10 Drawing Figures

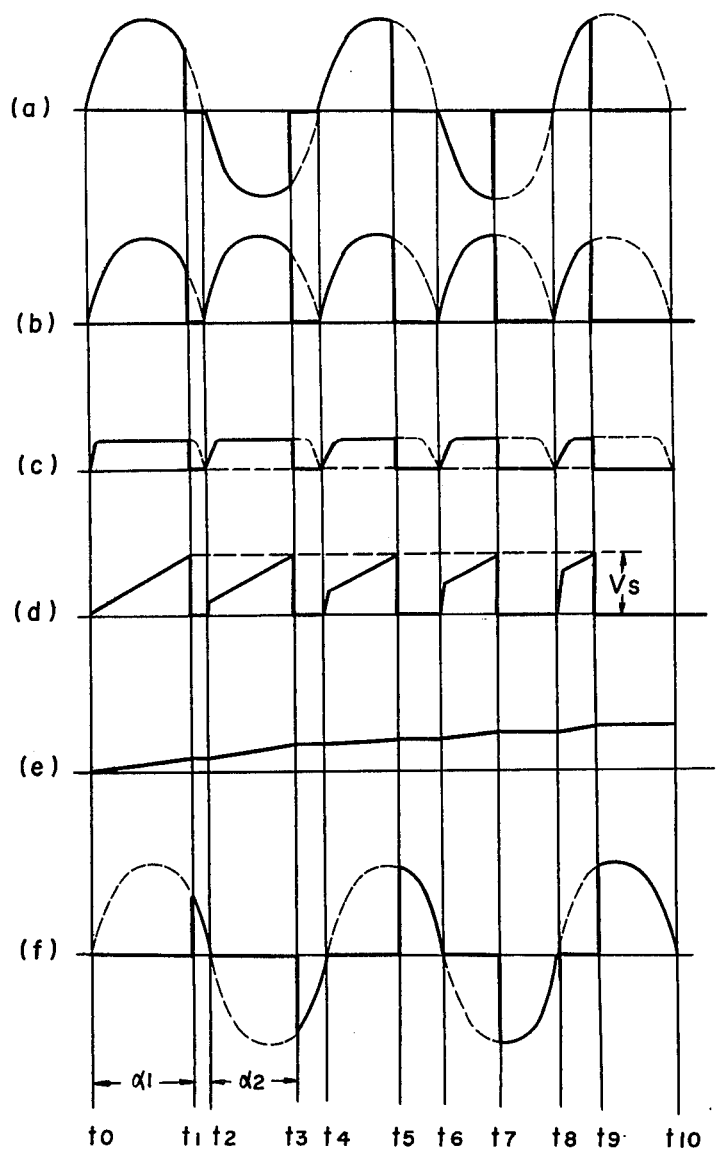

STARTING CONTROL APPARATUS FOR AC LOAD

BACKGROUND OF THE INVENTION

The present invention relates to a starting control apparatus for an AC load, More particularly, it relates to a starting control apparatus for starting an inductive load such as an induction motor.

In general, a line start system, directly turned on by operation of an electromagnetic switch, has been employed as a starting system for an AC load such as an induction motor because of the low cost.

FIG. 1 is a diagram showing the starting of the three-phase induction motor in the direct system. in FIG. 1, the three-phase induction-motor 1 is connected through an electromagnetic switch 2 to the three-phase AC power source (not shown). The power voltage is applied to the induction motor 1 by turning on the electromagnetic switch 2 to rotate the motor. The counter electromotive force during starting from a static state is zero in the induction motor 1 whereby the starting current is remarkably large. Usually the starting current is about 5 to 7 times the rated current in the rated speed and rated load.

The starting current is continuously fed during the predetermined starting period given by the moment of inertia of the load and the induction motor 1. When the induction motor 1 reaches its rated speed after starting, the power-factor is improved and reaches about 80% at the rated load. However, the power-factor at the static state is about 20 to 30% and accordingly, sometimes, rush current having about 1.4 times to about 5 to 7 times of the rated current is fed by the transient pehnomenon at some phase and turns on the electromagnetic switch 2. The phenomenon is maximum by turning on the electromagnetic switch at zero of the power voltage phase.

The rush current and the starting current are not so large when the capacity of the motor 1 is small. However, when the capacity of the motor 1 is large, the rush current and the starting current are large and the starting time is long whereby it is disadvantageous for the electric line and the motor 1. Accordingly, the line start system can be used for starting a motor having a small capacity but there is a problem is using the direct turn-on system for starting a motor having a large capacity.

The electromagnetic switch 2 has a movable contactor and the switching operation is performed by the attractive force of an exciting coil (not shown) and the repulsive force of a coil spring (not shown). Accordingly, an arc is generated between the contacts during the switching operation whereby abrasion of the contact is disadvantageously caused. The switching operation is performed by mechanical force with the result that noise and vibration are considerable.

It is usual to employ a reactor starting system or Y-Δ starting system for starting a motor 1 having a large capacity. FIG. 2 is a diagram of a circuit for starting a three-phase induction motor by a conventional reactor starting system.

In FIG. 2, the three-phase induction motor 1 is connected through a series connection of a first electromagnetic switch 2a and a reactor 3 and second electromagnetic switches 2b to the three-phase power source (not shown). At the starting of the motor, the first electromagnetic switch 2a is turned on in the OFF state of the second electromagnetic switch 2b. A voltage several tens % lower than the power voltage is applied to the motor 1 by a reactor 3, whereby the rush current and the starting current are suppressed to start the rotation of the motor 1. When the motor 1 reaches a certain speed, that is a certain counter electromotive force of the motor 1 is generated, the first electromagnetic switch 2a is turned off and the second electromagnetic switch 2b is turned on whereby the power voltage is applied to the motor 1 and the speed is increased to reach the rated speed to complete the starting operation.

In the reactor starting system, the rush current and the starting current are advantageously suppressed by applying a partial voltage to the motor by using the reactor 3 at the starting operation, whereby the electric line is protected and the mechanical shock applied to the motor 1 is weakened and a force is not suddenly applied to the load of the motor 1. However, the reactor starting system gives a stepping starting operation whereby a smooth starting operation is not attained. Moreover, two electromagnetic switches 2a, 2b are used, whereby the abrasion of contacts of the electromagnetic switches 2a, 2b, and the generation of noise and vibration are still caused.

SUMMARY OF THE INVENTION

An object of the present invention is to provide a starting control apparatus for an AC load which attains a smooth starting operation without suddenly starting a load having a large capacity by feeding a current which gradually increases during a predetermined starting period to the load by gradually decreasing a turn-on angle of a bidirectional triode thyristor switching device which is connected in series between the AC power source and the load.

Another object of the invention is to provide a starting control apparatus which suppresses the rush current and the starting current without failure to smoothly start an inductive load such as an induction motor.

Another object of the invention is to provide a starting control apparatus for an AC load which has no contact which cause abrasion, noise and vibration.

BRIEF DESCRIPTION OF THE DRAWINGS

FIG. 5 is a diagram showing waveforms for illustrating the starting operation for a resistant load;

DETAILED DESCRIPTION OF THE PREFERRED EMBODIMENTS

The purposes, embodiments, uses and advantages of the present invention will be understood by the following illustrations.

Figure 3:
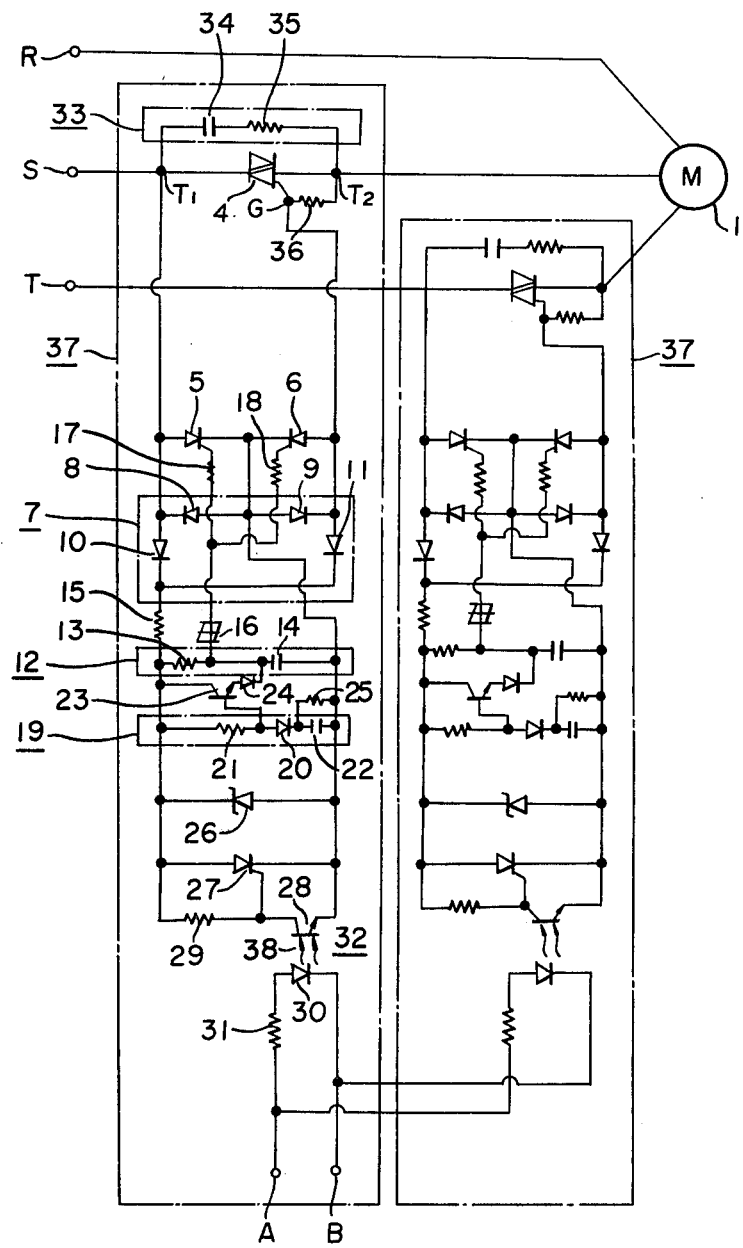
FIG. 3 is a diagram of one embodiment of the starting control apparatus of the present invention in a three-phase circuit.

In FIG. 3, a triac 4 is connected in series between the AC power source (not shown) and an induction motor 1, and auxiliary thyristors 5, 6 are connected in series in reverse direction and the anodes of the auxiliary thyristors 5, 6 are respectively connected to the main terminal $T_1$ and the control terminal G of the triac 1. A single-phase full wave rectifying circuit 7 comprises a bridge connection of diodes 8 to 11, and one input terminal of the circuit 7 is connected to the main terminal $T_1$ and the control terminal G of the triac 4, and one output terminal of the circuit 7 is connected to the contact between the thyristors 5, 6.

A first time constant circuit 12 comprises a resistor 13 and a capacitor 14 connected in series, and connected through a limiting resistor 15 to the output terminals of the rectifier circuit 7. One terminal of a single way switching element (hereinafter referred to as SUS) 16 is connected to a contact between tghe resistor 13 and the capacitor 14 which forms the first time constant circuit and the other terminal of the SUS 16 is connected through the resistors 17, 18 to the gates of the thyristors 5, 6, respectively.

A second time constant circuit 19 comprises a resistor 21 and a capacitor 22 which are connected in series through a diode 20 for preventing reverse current which is forwardly connected. The second time constant circuit 19 has a larger time constant than that of the first time constant circuit 12.

A collector of a NPN transistor 23 is connected to a contact between the resistors 13, 21, the emitter thereof is connected through a diode 24 to a contact between the resistor 13 and the capacitor 14 and the base thereof is connected to a contact between the diode 20 and the resistor 21 whereby a speed charger is formed.

A discharge resistor 25 is connected in parallel to the capacitor 22 to discharge the capacitor 22 during a relatively long period. A Zener diode 26 is connected in parallel to the second time constant circuit 19 to clip the voltage between the terminals thereof so as to protect the other elements connected between the terminals from overvoltage. A synchronizing thyristor 27 is connected in parallel to the Zener diode 26. A series circuit of a photo-transistor 28 and a resistor 29 is connected in parallel to the thyristor 27, and the contact between the photo-transistor 28 and the resistor 29 is connected to the gate of the thyristor 27.

Terminals A, B for applying DC voltage to a luminous diose 30 are also connected in series to a current controlling resistor 31. A photo-coupler 32 is formed with the luminous diode 30 and the photo-transistor 28. A voltage surge absorber 33 is formed by connecting a capacitor 34 and a resistor 35 in series between the main terminals $T_1$, $T_2$ of the triac 4 whereby the triac 4 is protected from overvoltage. A resistor 36 is connected between the control terminal G and the other main terminal $T_2$ of the triac 4.

The starting control apparatus of the invention is formed by the above-mentioned parts, and is connected to a line S of one phase. As it is three-phase AC, a starting control apparatus 37 which has the same structure as the starting control apparatus 36 is connected to the other one line T of the three-phase.

This embodiment shows the application for a three-phase circuit. The operating principle is substantially the same for the application of a single-phase circuit and a three-phase circuit.

Figure 1:
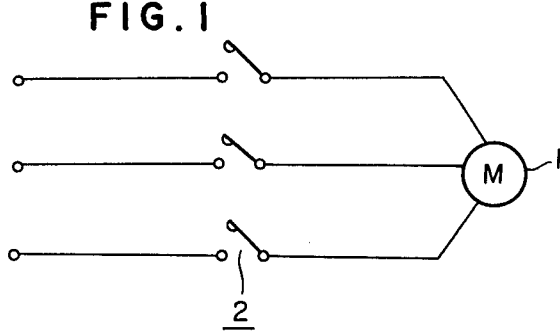
FIG. 1 is a diagram for illustrating the starting of a three-phase induction motor in the conventional direct system.
Figure 2:
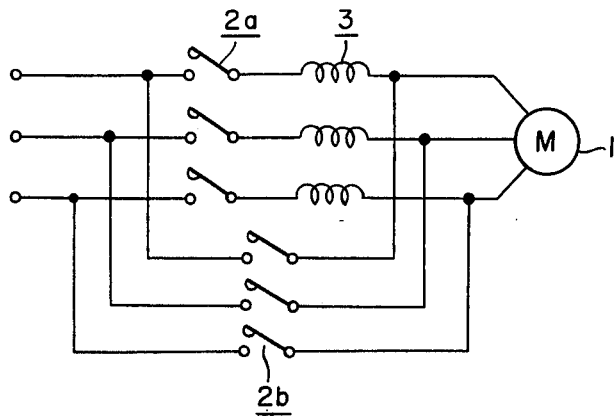
FIG. 2 is a diagram for illustrating the starting of a three-phase induction motor in the conventional reactor starting system.
Figure 4:
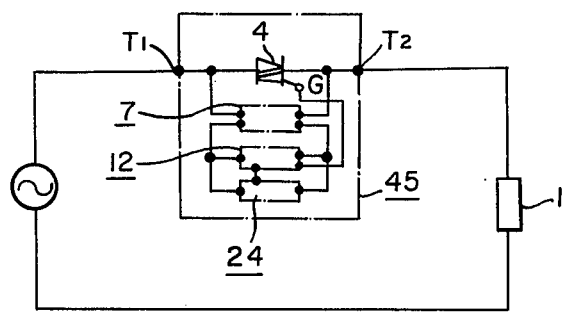
FIG. 4 is a diagram of one embodiment of the starting control apparatus of the present invention in a single-phase circuit.

In order to simplify the illustration, the operation for the application of a single-phase circuit as shown in FIG. 4 will be described in detail.

Referring to FIG. 5, the case of FIG. 4 wherein the load 1 is a resistant load will be described. As shown in FIG. 5, when the DC voltage is applied to the terminals A, B for applying DC voltage after the time $t_0$ so as to be positive at the terminal A, the current is fed through the resistor 31 to the luminous diode 30 whereby the luminous diode emits an optical emitting signal 38. The photo-transistor 28 which is optically coupled is turned on by receiving the emitted signal 38 to saturate the voltage between the collector and the emitter. Accordingly, the voltage applied between the gate and cathode of the thyristor 27 is fixed by the saturated voltage between the collector and the emitter of the photo-transistor 28 whereby the thyristor 27 is not turned on without feeding the gate current to the thyristor 27.

When the triac 4 is in the OFF state, the sine wave voltage shown by the broken line in FIG. 5(a) is applied between the main terminals $T_1$, $T_2$ of the triac 4 from the power source. When the voltage between one main terminal $T_1$ and the control terminal G of the triac 4 (which is substantially the same as the voltage between the main terminals $T_1$, $T_2$ of the traic 4) is applied to the input terminal of the rectifying circuit 7, the output voltage shown by the broken line in FIG. 5(b) (full wave rectified) is obtained at the output terminal. Accordingly, when the thyristor 27 is in the OFF state, the rectified output voltage is clipped by the Zener diode 26 and the voltage shown by the broken line in FIG. 5(c) appears between the terminals of the Zener diode. The voltage between the terminals of the Zener diode 26 is also applied to the first time constant circuit 12 whereby the capacitor 14 is charged through the resistor 13 as shown in FIG. 5(d).

When the charged potential reaches the switching voltage $V_s$ of the SUS 16 at the time $t_1$, the SUS 16 is turned on whereby the charge in the capacitor 14 is suddenly discharged to the gate of the thyristor 5 or 6, whereby the thyristor 5 or 6 is turned on.

Whether the thyristor 5 or 6 turns on depends upon the phase of voltage applied between the main terminal $T_1$ to the control terminal G of the triac 4. When the potential at the main terminal $T_1$ to the control terminal G is positive, the thyristor 5 is turned on to feed the current from the thyristor 5 to the diode 9, whereby the voltage is applied between the control terminal G and the main terminal $T_2$ of the triac 4 and the resistor 36 so as to turn on the triac 4. When the potential at the main terminal $T_1$ to the control terminal G is negative, the voltage is applied between the main terminal $T_2$ and the control terminal G of the triac 4 and the resistor 36 whereby the thyristor 6 is turned on so as to turn on the triac 4 and the current is fed through the diode 8 to the main terminal $T_1$.

When the triac 4 is turned on at the predetermined turn-on angle $\alpha_1$, the main current of the triac 4 is fed from the time $t_1$ to $t_2$ as shown by the full line in FIG. 5(f), and the current is fed to the load 1. As stated above, when the triac 4 is turned on at the time $t_1$, the voltage between the main terminals $T_1$, $T_2$ of the triac 4 is suddenly decreased to the voltage drop value (about 1 to 2 volts) as shown by the full line in FIG. 5(a). Accordingly, the output voltage of the rectifying circuit 7 and the voltage between the terminals of the Zener diode 26 are respectively decreased to a voltage substantially the same as the voltage drop shown by the full line in FIGS. 5(b), (c). Accordingly, the charging of the capacitor 14 of the first time constant circuit 12 is not initiated until the next half cycle (time $t_2$) when it is discharged at the time $t_1$ as shown in FIG. 5(d).

The operation of the second time constant circuit 19 is important. The capacitor 22 of the second time constant circuit 19 is charged through the resistor 21 and the diode 20 from the time period $t_0 - t_1$ as shown in FIG. 5(e). The time constant of the second time constant circuit is selected to be larger than the time constant of the first time constant circuit 12. Accordingly, it is charged regardless of the first time constant circuit 12. When the triac 4 is turned on at the time $t_4$ and the output voltage of the rectifying circuit 7 is decreased as stated above, the charging operation is stopped. Since the value of discharge resistor 25 is selected to be sufficiently large, the charged potential at the time $t_1$ is maintained.

The voltage between the terminals of the Zener diode 26 is again applied to the first and second time constant circuits 12, 19 by applying the half cycle voltage between the main terminal $T_1$ and the control terminal G of the triac 4 while recovering the controlling ability of the triac 4 at the time $t_2$, whereby the capacitors 14, 22 are charged. The capacitor 22 maintains the charged potential at the time $t_1$, and accordingly, the transistor 23 is immediately turned on and the capacitor 14 is charged quickly by the transistor 23 to the potential of the capacitor 22 as shown in FIG. 5(d). After the speedy charging, the diode 24 is inversely biased to turn off the transistor 23 whereby the first time constant circuit 12 is disconnected from the second time constant circuit 19 and the capacitors 14, 22 are respectively charged through the resistors 13, 21 as shown in FIGS. 5(d), (e).

When the charged potential of the capacitor 14 reaches the switching voltage $V_s$ of the SUS 16 at the time $t_3$, the SUS 16 is turned on to turn on the thyristor 5 or 6, and then the triac 4 is turned on to feed the current to the load 1. In this case, the time period $t_3 - t_2$ for the charged potential of the capacitor 14 to reach the switching voltage $V_s$ of the SUS 16 is decreased from the charging period $t_1 - t_0$ at the former half cycle for the period of initial speedy charging. Accordingly, the turn-on angle $\alpha_2$ is smaller than the turn-on angle $\alpha_1$ at the former half cycle, whereby the current passed through the load 1 is increased as shown in FIG. 5(f). The capacitor 22 of the second time constant circuit 19 is also charged for the time period $t_2 - t_3$ as shown in FIG. 5(e), and the charging is stopped at the time $t_3$ of turning on the triac 4.

When the capacitor 14 of the first time constant circuit 12 is recharged at the time $t_4$ of initiation of the next half cycle, the speedy charging of the capacitor 14 takes place, and the turn-on phase of the triac 4 further gains. The time for the charged potential of the capacitor 14 to reach the switching voltage $V_s$ of the SUS 16 is gradually decreased whereby the phase for turning on the triac 4 can be forwardly advanced at slow speed sequentially to about a 20° to 30° of turn-on angle. Accordingly, the current fed to the load is gradually increased as shown in FIG. 5(f) whereby the sudden starting operation of the load 1 can be prevented, and a soft starting control can be attained.

On the other hand, when the DC voltage is not applied to the terminals A, B for applying DC voltage, the current is not fed through the luminous diode 30 whereby the photo-coupler 32 is not operated and the photo-transistor 28 is not turned on and all of the current passed through the resistor 29 is fed to the gate of the thyristor 27 to turn on the thyristor 27. The voltage between the anode and the cathode of the thyristor 27 is decreased to a voltage drop of about 1 volt by turning on the thyristor 27, whereby the first and second time constant circuits 12, 19 connected to the terminals of the thyristor are clipped to the voltage between the anode and the cathode of the thyristor and are not operated. Accordingly, the thyristors 5, 6 and the triac 4 are not turned on and the current is not fed to the load 1.

As stated above, the photo-coupler 32 is actuated to turn on and off the gate-cathode of the thyristor 27. The first and second time constant circuits 12, 19 connected to the anode-cathode of the thyristor 27 and others can be operated as predetermined only when the thyristor 27 is in the OFF state. That is, the starting control apparatus 37 is controlled to perform the predetermined operation or not depending upon the ON and the OFF state of the thyristor 27.

In this embodiment, the load 1 is a resistant load. Accordingly, as shown in FIG. 5, the time for recovering the controlling ability of the triac 4 to stop feeding the current to the load 1 is the time when the power voltage is zero. At this time, the synchronizing is attained whereby the apparatus 37 is operated in normal condition even though the time constant of the second time constant circuit 19 is increased. Accordingly, the soft starting period can be varied from several tens of milli-seconds to several seconds by using the variable resistor 21. However, when the load 1 is an inductive load such as an induction motor, the time constant of the second time constant circuit 19 can not be increased over a certain limit.

Figure 6:
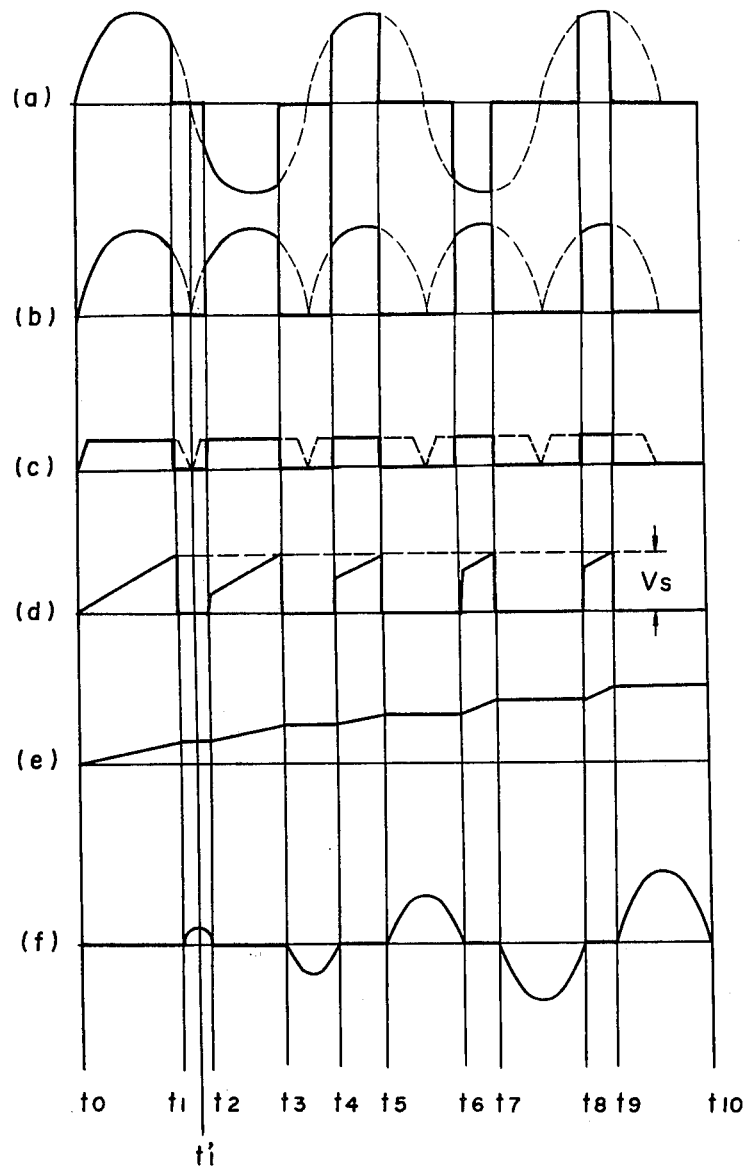
FIG. 6 is a diagram showing waveforms for illustrating the starting operation for an inductive load.

Referring to FIG. 6, the case of the inductive load 1 in the embodiment of FIG. 4 will be described. When DC voltage is applied between the terminals A, B after the time $t_0$, the operation is the same as that of the resistant load in FIG. 5 during the former half cycle. At the time $t_1$, the triac 4 is turned on to feed the current shown in FIG. 6(f) to the load. However, as shown in FIG. 6(d), the charging initiation of the capacitor 14 in the first positive cycle is different from that of the next negative cycle.

In the case of a resistant load, the time for initiating the charging in the negative cycle corresponds to the time $t'_1$ in FIG. 6. On the other hand, in the case of an inductive load, the charging is initiated at the time $t_2$ as shown in FIG. 6(d), because the load current shown in FIG. 6(f) delays the power-factor for the voltage between the main terminals $T_1$, $T_2$ of the triac 4, and the load current is not zero when the power voltage is zero, and the load current becomes zero at the time $t_2$. Accordingly, the voltage is not applied between the main terminal $T_1$ and the control terminal G until the time $t_2$ as shown in FIG. 6(a), and an output voltage of the rectifier circuit 7 is not applied as shown in FIG. 6(b) and the capacitor 14 is not charged. At the time $t_2$, the controlling ability of the triac 4 is recovered and the voltage is applied between the main terminal $T_1$ and the control terminal G to initiate the next half cycle operation.

Of course, the second time constant circuit 19 operates as stated above to charge the capacitor 22 as shown in FIG. 6(e). Accordingly, the capacitor 14 is quickly charged to obtain the turn-on phase of the triac 4 in comparison with that of the former half cycle. The triac 4 is turned on at the time $t_3$. The charging period for the capacitors 14, 22 is decreased for the time period $t_2 - t'_1$ in comparison with that of the resistant load. That is, if the time constant of the second time constant circuit 19 is too large, the charged voltage of the capacitor 22 is too low whereby the triac 4 is turned on at a time delayed from the time $t_3$, and sometimes, the turn-on phase of the negative cycle lags the turn-on phase of the former positive cycle.

It is possible to obtain the turn-on phase without failure by selecting the time constant of the second time constant circuit 19 to be several times the time constant of the first time constant circuit 12 with consideration of the charging time which must be shorter for the time period $t_2 - t'_1$. Accordingly, in the case of an inductive load, it is difficult to prolong the soft starting period to several seconds as that of the resistant load, and it is limited to about several tens of milli-seconds. When a soft starting control is performed for such a period, the starting current can be controlled as desired to smoothly start the load 1.

The single-phase circuit has been described above. The three-phase circuit shown in FIG. 3 can be also operated in the same manner to perform the soft starting control.

Figure 7:
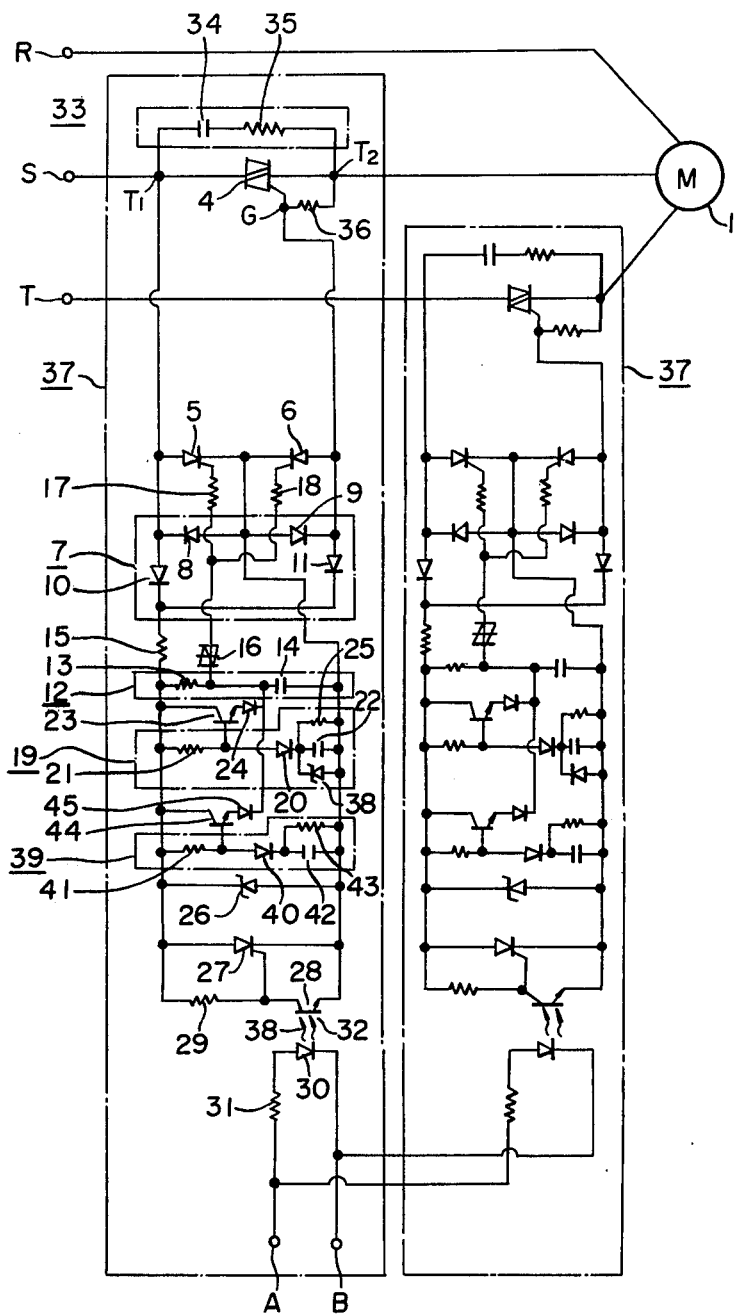
FIG. 7 is a diagram of a circuit of another embodiment of the invention.

FIG. 7 is a diagram of the circuit of another embodiment of the invention which is a starting control circuit especially suitable for starting an inductive load. In FIG. 7, like reference numerals designate identical or corresponding parts, and the new elements will be described in detail.

A Zener diode 38 is connected in parallel to a capacitor 22 and the voltage between the terminals is clipped by the Zener voltage. A third time constant circuit 39 comprises a resistor 41 and a capacitor 42 which are connected in series through a diode 40 for preventing reverse-current which is forwardly connected and a discharge resistor 31 which is connected in parallel to the capacitor 42 to discharge the capacitor 42 during a long period, and has a time constant for charging which is greater than the time constant of the second time constant circuit 19 for charging.

A NPN transistor 44 has a collector connected to the contact between resistors 21, 41, an emitter connected through a diode 45 to the contact between the resistor 13 and the capacitor 14 and a base connected to the contact between the diode 40 and the resistor 41. A speedy charging device is formed by the NPN transistor 44 and the other EPN transistor 23.

FIG. 7 shows the embodiment for a three-phase circuit. The operating principle is substantially the same for the application of a single-phase circuit and a three-phase circuit.

Figure 8:
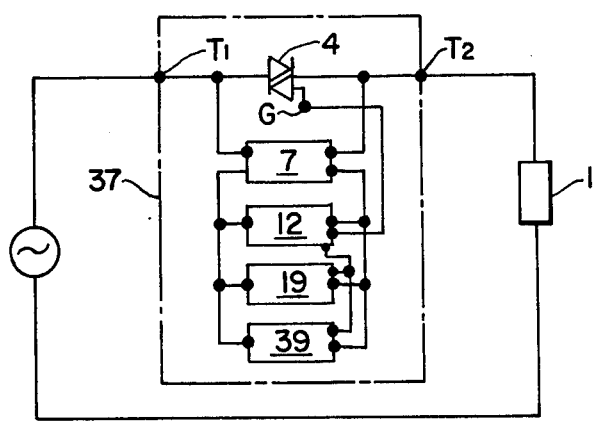
FIG. 8 is a block diagram of the embodiment of FIG. 7 which is applied to a single phase circuit.

In order to simplify the description, the operation for a single-phase circuit as shown in FIG. 8 will be described in detail.

Figure 9:
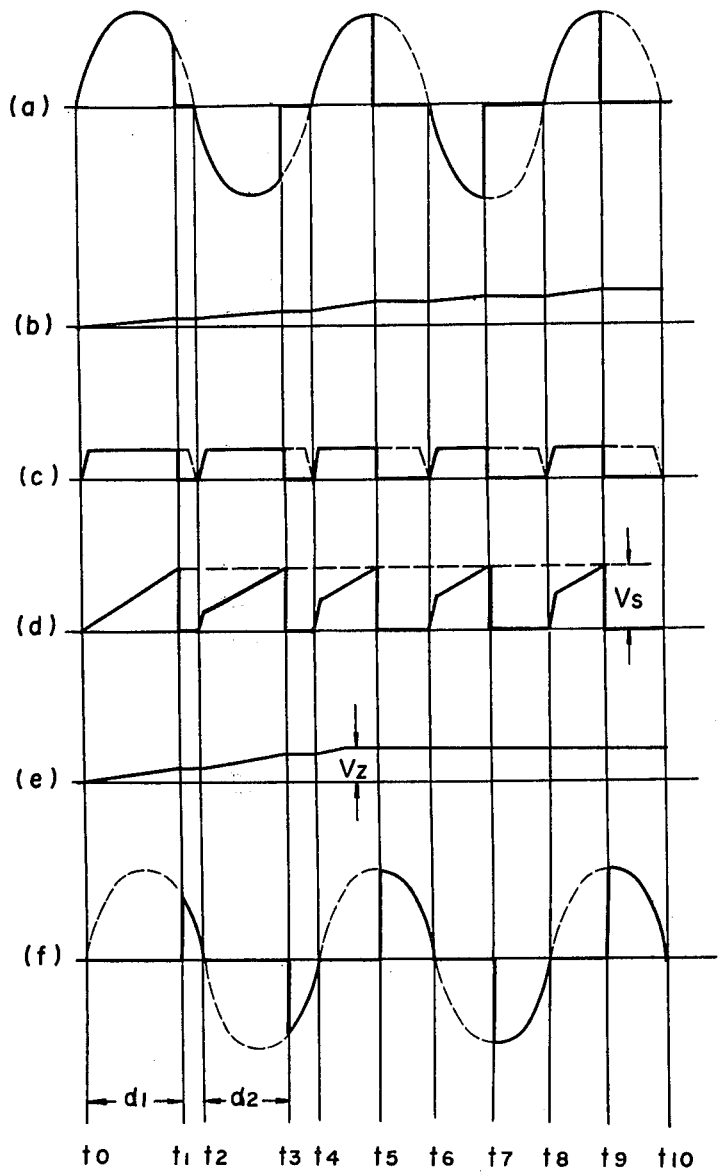
FIG. 9 is a diagram showing waveforms for illustrating the starting operation for a resistant load in the embodiment of FIG. 7.

Referring to FIG. 9, the case of FIG. 8 wherein the load is a resistant load will be described. As shown in FIG. 9, when the DC voltage is applied to the terminals A, B for applying DC voltage after the time $t_O$ so as to be positive at the terminal A, the photo-coupler 32 is actuated and the thyristor 27 is in the OFF state. When the triac 4 is in the OFF state, the sine wave voltage shown by the broken line in FIG. 9(a) is applied from the power source between the main terminals $T_1$, $T_2$ of the triac 4. Accordingly, when the thyristor 27 is in the OFF state, the rectified output voltage is clipped by the Zener diode 26 and the voltage shown by the broken line in FIG. 9(c) appears between the terminals of the Zener diode.

The voltage between the terminals of the Zener diode 26 is also applied to the first time constant circuit 12 whereby the capacitor 14 is charged through the resistor 13 as shown in FIG. 9(d). When the charged potential reaches the switching voltage $V_s$ of the SUS 16 at the time $t_1$, the SUS 16 is turned on whereby the charge in the capacitor 14 is suddenly discharged to the gate of the thyristor 5 or 6 whereby the thyristor 5 or 6 is turned on. When the triac 4 is turned on at the predetermined turn-on angle $\alpha_1$, the main current of the triac 4 is fed from time $t_1$ to $t_2$ as shown by the full line in FIG. 9(f), and the current is fed to the load 1.

As stated above, when the triac 4 is turned on at the time $t_1$, the voltage between the main terminals $T_1$, $T_2$ of the triac 4 is suddenly decreased to the voltage drop value (about 1 to 2 volts) as shown by the full line in FIG. 9(c). Accordingly, the output voltage of the rectifier circuit 7 and the voltage between the terminals of the Zener diode 26 are respectively decreased to a voltage substantially the same as the voltage drop as shown in FIG. 9(c). Accordingly, the charging of the capacitor 14 of the first time constant circuit 12 is not initiated until the next half cycle (time $t_2$) and is discharged at the time $t_1$.

The operations of the second and third time constant circuits 19, 39 are significant. The capacitor 22 of the second time constant circuit 19 is charged through the resistor 21 and the diode 20 during the time period $t_0 - t_1$ as shown in FIG. 9(e). The time constant of the second time constant circuit is selected to be greater than the time constant of the first time constant circuit 12. Accordingly, it is charged regardless of the first time constant circuit 12. When the triac 4 is turned on at the time $t_1$ and the output voltage of the rectifier circuit 7 is decreased as stated above, the charging operation is stopped. As the resistance of discharge resistor 25 is selected to be sufficiently great, the charged potential at the time $t_1$ is maintained.

The voltage between the terminals of the Zener diode 26 is again applied to the first and second time constant circuits 12, 19 by applying the half cycle voltage between the main terminal $T_1$ and the control terminal G of the triac 4 at the time $t_2$, whereby the capacitors 14, 22 are charged. The capacitor 22 maintains the charged potential at the time $t_1$ and accordingly, the transistor 23 is immediately turned on and the capacitor 14 is charged quickly by the transistor 23 to the potential of the capacitor 22 as shown in FIG. 9(d). After the speedy charging, the diode 24 is inversely biased to turn off the transistor 23 whereby the first time constant circuit 12 is disconnected from the second time constant circuit 19 and the capacitors 14, 22 are respectively charged through the resistors 13, 21 as shown in FIGS. 9(d), (e).

When the charged potential of the capacitor 14 reaches the switching voltage $V_s$ of the SUS 16 at the time $t_3$, the SUS 16 is turned on to turn on the thyristors 5 or 6, and then the triac 4 is turned on to feed the current to the load 1. In this case, the time period $t_3 - t_2$ for the charged potential of the capacitor 14 to reach the switching voltage $V_s$ of the SUS 16 is decreased from the charging period $t_1 - t_0$ at the former half cycle for the period of initial speedy charging. Accordingly, the turn-on angle $\alpha_2$ is smaller than the turn-on angle $\alpha_1$ at the former half cycle, whereby the current passed through the load 1 is increased as shown in FIG. 9(f).

The capacitor 22 of the second time constant circuit 19 is also charged for the time period $t_2 - t_3$ as shown in FIG. 9(e), and the charging is stopped at the time $t_3$ of turning on the triac 4. When the capacitor 14 of the first time constant circuit 12 is recharged at the time $t_4$ of initiation of the next half cycle, the speedy charging of the capacitor 14 is obtained, and the turn-on phase of the triac 4 is advanced. The time for the charged potential of the capacitor 14 to reach the switching voltage $V_s$ of the SUS 16 is gradually decreased whereby the phase for turning on the triac 4 can be forwardly advanced at slow speed sequentially.

The Zener diode 38 is connected in parallel to the capacitor 22. Accordingly, the charged potential is fixed by the Zener voltage $V_z$ when the charged potential of the capacitor 22 reaches the Zener voltage $V_z$ of the Zener diode 38 at the time from $t_4$ to $t_5$ as shown in FIG. 9(e), whereby the turn-on phase of the triac 4 is also fixed.

The third time constant circuit 39 is connected in parallel to the first time constant circuit 12. The time constant of the third time constant circuit is selected to be greater than the time constant of the second time constant circuit 19.

The capacitor 42 of the third time constant circuit 39 is repeatedly charged and the charged potential is maintained regardless of the first and second time constant circuits 12, 19 as shown in FIG. 9(b). When the charged potential of the capacitor 42 reaches the maximum charged potential of the capacitor 22 of the second time constant circuit 19, that is the Zener voltage $V_z$ of the Zener diode 38, after a certain period, the transistor 44 is immediately turned on to charge the capacitor 14 to the potential of the capacitor 42. Accordingly, the fixed turn-on angle of the triac 4 is gradually advanced about 20° to 30° of the turn-on angle. The current fed to the load 1 is gradually increased for a long period whereby the sudden starting of the load 1 can be prevented to attain smooth starting of the load.

In this embodiment, the load 1 is a resistant load. Accordingly, as shown in FIG. 9, the time for recovering the controlling ability of the triac 4 to stop feeding the current to the load 1 is the time when the power voltage is zero. At this time, synchronizing is attained whereby the apparatus 37 is operated in a normal condition even though the time constants of the second and third time constant circuits 19, 39 are increased. Accordingly, the soft starting period can be varied from several tens of milli-seconds to several seconds by using the variable resistors 21, 41. However, when the load 1 is an inductive load such as an induction motor, the time constant of the second time constant circuit 19 can not be increased over a certain limit.

Figure 10:
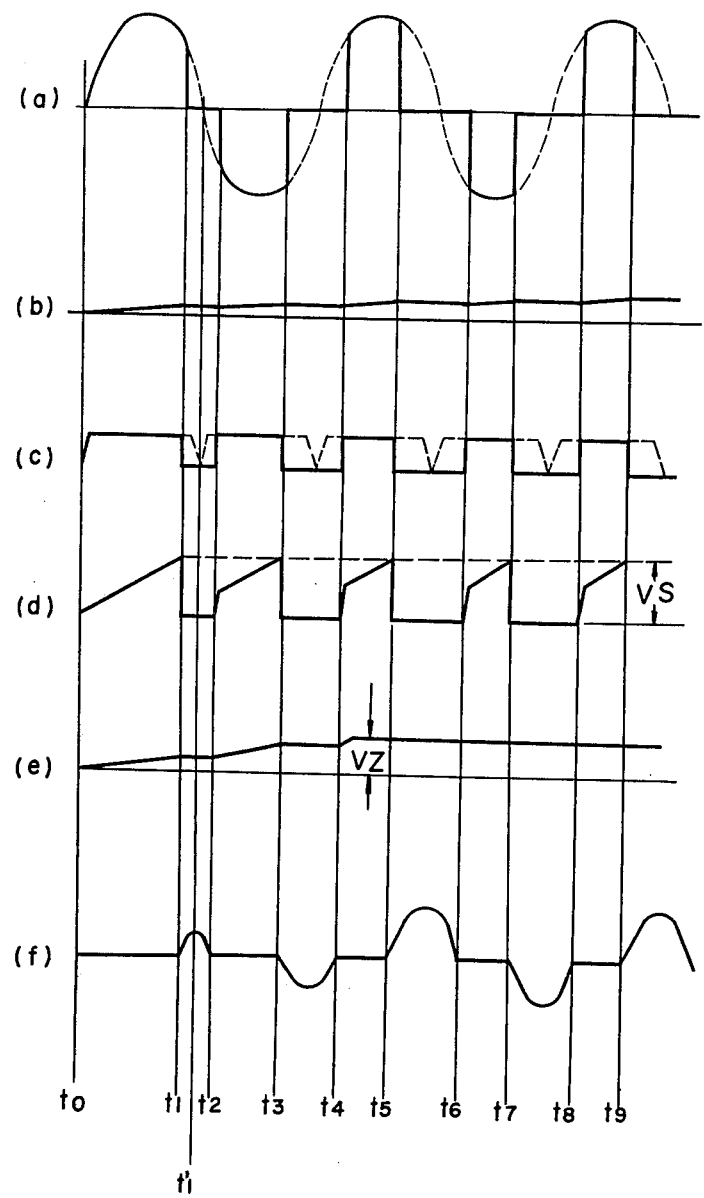
FIG. 10 is a diagram showing waveforms for illustrating the starting operation for an inductive load in the embodiment of FIG. 7.

Referring to FIG. 10, the case of the inductive load 1 in the embodiment of FIG. 8 will be described. When DC voltage is applied between the terminals A, B after the time $t$, the operation is the same as that of the resistant load in FIG. 9 during the former half cycle.

At the time $t_1$, the triac 4 is turned on to feed the current shown in FIG. 10(f) to the load. However, as shown in FIG. 10(d), the charging initiation of the capacitor 14 in the first positive cycle is different from that of the next negative cycle.

In the case of the resistant load, the time for initiating the charging in the negative cycle corresponds to the time $t_1$ in FIG. 10. On the other hand, in the case of the induction load, the charging is initiated at the time $t_2$ as shown in FIG. 10(d), because the load current shown in FIG. 10(f) delays the power-factor for the voltage between the main terminals $T_1$, $T_2$ of the triac 4 and the load current is not zero when the power voltage is zero, and the load current becomes zero at the time $t_2$. Accordingly, the voltage is not applied between the main terminal $T_1$ and the control terminal G unitl the time $t_2$ as shown in FIG. 10(a), and an output voltage of the rectifier circuit 7 does not appear and the capacitor 14 is not charged.

At the time $t_2$, the controlling ability of the triac 4 is recovered and the voltage is applied between the main terminal $T_1$ and the control terminal G to initiate the next half cycle operation.

Of course, the second time constant circuit 19 operates as stated above to charge the capacitor 22 as shown in FIG. 10(e). Accordingly, capacitor 14 is quickly charged to advance the turn-on phase of the triac 4 in comparison with that of the former half cycle.

The traci 4 is turned on at the time $t_3$. The charging period for the capacitors 14, 22 is decreased for the time period $t_2 - t'_1$, in comparison with that of the resistant load. That is, if the time constant of the second time constant circuit 19 is too large, the charged voltage of the capacitor 22 is too small whereby the triac 4 is turned on at a time delayed from the time $t_3$ and sometimes, the turn-on phase of the negative cycle lags the turn-on phase of the former positive cycle.

It is possible to obtain the turn-on phase without failure by selecting the time constant of the second time constant circuit 19 to be several times the time constant of the first time constant circuit 12 with consideration of the charging time which must be shorter for the time period $t_2 - t'_1$. The rush current and the starting current after just starting can be suppressed in the above-mentioned manner and then the turn-on phase is fixed depending upon the Zener voltage $V_z$ of the Zener diode 38.

As stated above, the capacitor 42 of the third time constant circuit 39 is charged as shown in FIG. 10(b). When the charged potential reaches the Zener voltage $V_z$, the fixed turn-on phase of the triac 4 is changed and is gradually advanced again to about 20° to 30° of the turn-on angle. In this case, the time constant of the third time constant circuit 39 is given for the time corresponding to the starting period required depending upon the capacity of the load 1. The starting current can be suppressed without failure for all of the starting period. That is, the third time constant circuit 39 is not necessary in the case of a resistant load 1, and it is possible to obtain about several seconds of the starting period by selecting a large enough time constant for the second time constant circuit 19.

However, in the case of an inductive load, it is difficult to select a large time constant for the second time constant circuit 19, whereby only several tens of milli-seconds of the starting period can be obtained by the second time constant circuit 19. Accordingly, when the load 1 has a large capacity, it is difficult to suppress the starting current during all of the starting period required for the capacity.

In accordance with the starting control apparatus 37 of this embodiment, the soft starting control is performed by the second time constant circuit 19 just after starting and then the soft starting control is performed by the third time constant circuit 39 which has a large time constant. Accordingly, the starting current can be suppressed without failaur during all of the required starting period even in the case of an inductive load having a large capacity. Moreover, the current fed to the load 1 is continuously and gradually increased. Accordingly, starting in stepwise operation as in conventional reactor starting is not obtained, rather smooth starting is obtained.

The phenomena of the operation of the apparatus 37 can be considered for the first period for quickly advancing the turn-on phase just after applying DC voltage to the terminals A, B, for the second period for fixing the turn-on phase and for the third period for gradually advancing the turn-on phase again to about 20° to 30° of the turn-on angle.

When the load 1 is an induction motor in the first period, the rush current of the induction motor is suppressed, and in the second period, the torque at the starting period is determined, and in the third period, the starting period is determined and the starting current is suppressed during the starting period. That is, the starting torque can be selected by selecting the Zener voltage of the Zener diode 38.

The starting period can be determined by selecting the time constant of the third time constant circuit 39. The rush current and the starting current can be suppressed during all of the required starting period to attain smooth starting operation. Accordingly, it is especially effective to use the apparatus for the starting operation of an induction motor.

The case of the single-phase circuit has been described. In the case of the three-phase circuit of FIG. 3, the same operation can be attained to perform the soft start control.

When the phase control of the three-phase circuit is performed by using a semiconductor switching element, it is necessary to correspond a voltage phase of a main circuit to a voltage phase of a control circuit for normal operation in many cases. Accordingly, it may not be easy to use the apparatus. However, in accordance with the above-mentioned embodiment, the phase control can be performed by applying the voltage between the main terminal $T_1$ and the control terminal G of the triac 4 connected to the main circuit to the control circuit whereby normal operation can be performed regardless of the phase order and the above-mentioned disadvantage can be overcome.

In accordance with the above-mentioned embodiment, no contact circuit system is employed. Accordingly, the abrasion of the contact and the noise and vibration generated by the operation thereof are not caused as is the case with a conventional electromagnetic switch.

In the embodiments, the triac 4 is used. However, it is possible to perform the starting control by using the auxiliary thyristors 5, 6 without using the triac 4. It is also possible to utilize a plurality of thyristors connected in reverse parallel instead of the triac 4.

As stated above, in accordance with the invention, the turn-on phase of the two way semiconductor switching device connected in series between the AC power source and the load can be sequentially advanced during the predetermined starting period depending upon the load. The load can be started by feeding the current which is gradually increased whereby a smooth soft starting control can be attained.

In the case of an inductive load for generating a counter electromotive force wsuch as in induction motor, the turn-on phase is obtained without failure by selecting the time constant of the second time constant circuit to be a suitable value whereby the rush current can be suppressed. The required starting period can be satisfactorily selected by properly selecting the time constant of the third time constant circuit. Even though the load is an induction motor having large capacity, the starting current can be suppressed without failure in order to perform a smooth starting operation. Accordingly, the invention is remarkably effective.

What is claimed as new and desired to be secured by Letters Patent of the United States is:

1. A starting control apparatus for an AC load which comprises:
   a bidirectional triode thyristor switching device connected in series between an AC power source and the load;
   a rectifying circuit connected in parallel to the bidirectional triode thyristor switching device;
   a first time constant circuit connected between output terminals of the rectifying circuit which discharges to turn on the bidirectional triode thyristor switching device when the charged potential reaches a predetermined potential;
   a second time constant circuit connected between the output terminals of the rectifying circuit and having a time constant larger than the time constant of the first time constant circuit and maintaining the charged potential in the ON state of the bidirectional triode thyristor switching device; and
   a speedy charging device which rapidly increases the charged potential to the sustaining potential of the second time constant circuit during the recharging period for the first time constant circuit while recovering the controlling ability of the bidirectional triode thyristor switching device and which gradually decreases the period for charging the first time constant circuit to the predetermined potential.

2. A starting control apparatus according to claim 1 wherein the first time constant circuit comprises a series circuit of a resistor and a capacitor and a unidirectional switching element which is turned on by a predetermined charged voltage of the capacitor.

3. A starting control apparatus according to claim 1 wherein the second time constant circuit comprises a charging resistor, a diode and a capacitor connected in series and a discharging resistor connected in parallel to the capacitor.

4. A starting control apparatus according to claim 3 wherein the charging resistor is a variable resistor.

5. A starting control apparatus according to claim 3 wherein the discharging resistor sets a longer time constant for discharging.

6. A starting control apparatus according to claim 1 wherein the speedy charging device is a NPN transistor which has a collector connected to a contact between a resistor of the first time constant circuit and a resistor of the second time constant circuit, a base connected to a contact between a resistor and a diode of the second time constant circuit and an emitter connected through a diode to a contact between a resistor and a capacitor of the first time constant circuit.

7. A starting control apparatus according to claim 1 wherein the bidirectional triode thyristor switching device is a triac.

8. A starting control apparatus according to claim 1 wherein the bidirectional triode thyristor switching device comprises a reverse parallel connection of thyristors.

9. A starting control apparatus according to claim 1 wherein a constant voltage element is connected in parallel to the second time constant circuit to clip the voltage between the terminals thereof to a predetermined value.

10. A starting control apparatus according to claim 9 which further comprises a thyristor connected between terminals of the constant voltage element and a control circuit for controlling the thyristor in its ON-OFF states through a photo-coupler.

11. A starting control apparatus according to claim 1 wherein the time constant of the second time constant circuit is 2 to 10 times the time constant of the first time constant circuit.

12. A starting control apparatus according to claim 1 which further comprises a third time constant circuit connected between output terminals of the rectifying circuit and having a time constant larger than the time constant of the second time constant circuit and maintaining the charged potential in the OFF state of the bidirectional triode thyristor switching device.

13. A starting control apparatus according to claim 12 wherein the third time constant circuit comprises a charging resistor, a diode and a capacitor connected in series and a discharging resistor connected in parallel to the capacitor.

14. A starting control apparatus according to claim 13 wherein the charging resistor is a variable resistor.

15. A starting control apparatus according to claim 12 which further comprises an auxiliary speedy charging device which raises the charged potential higher than the sustaining potential of the second time constant circuit during the recharging period for the first time constant circuit while recovering the controlling ability of the bidirectional triode thyristor switching device and which gradually decreases the period for charging the first time constant circuit to the predetermined potential.

16. A starting control apparatus according to claim 15 wherein the auxiliary speedy charging device is a NPN transistor which comprises a collector connected to a contact between a charging resistor of the second time constant circuit and a charging resistor of the third time constant circuit, a base connected to the contact between a charging resistor and a diode of the third time constant circuit and an emitter connected through a diode to a contact between a resistor and a capacitor of the first time constant circuit.

* * * * *